Patented Jan. 13, 1925.

1,523,340

UNITED STATES PATENT OFFICE.

MARTIN BATTEGAY, OF MULHOUSE, FRANCE.

REACTION PRODUCT OF PHENOLS AND SULPHUR USEFUL AS MORDANTS AND PROCESS OF MAKING SAME.

No Drawing.    Application filed April 14, 1924.   Serial No. 706,597.

*To all whom it may concern:*

Be it known that I, MARTIN BATTEGAY, a citizen of the French Republic, and resident of Mulhouse, Alsatia, France, have invented new and useful Reaction Products of Phenols and Sulphur Useful as Mordants and Processes of Making Same, of which the following is a full, clear, and exact specification.

Sulphur reacts only very imperfectly with phenol heated to its boiling point. No change save a feeble and slow evolution of hydrogen sulfide can be detected.

For this reason the method hitherto used for sulfurizing phenol is that of Haitinger (Monatshefte für Chemie 4, 1883, page 66) in which phenolates obtained from phenols with alkali metal hydroxides for instance are heated with sulphur.

This method, however, offers grave technical difficulties connected with the separation of the sulfurized product, the lack of uniformity in the properties of the product and the imperfect yield.

The present invention relates to the manufacture of sulfurized phenol or sulfurized derivatives or substitution products of phenol by heating the material with sulphur in presence of a small proportion of iodine or other halogen which acts as a catalyst.

For example, a mixture of two molecular proportions of phenol (188 grams), 3½ atomic proportions of sulphur (107 grams) and a little iodine, may be heated in a flask having a reflux condenser, and placed in an oil bath; at about 190° C. (the temperature of the oil bath) there is abundant evolution of sulfuretted hydrogen.

It would appear that in the course of the operation there is formed in a first phase, iodophenol and hydrogen iodide, while in a second phase, which occurs at about the temperature of the boiling point of phenol, there is seen in the reflux condenser vapour of iodine, which becomes reabsorbed by the condensed vapour of phenol. The iodophenol apparently undergoes a dissociation which facilitates the sulfurization and the free iodine returns to the mass to play afresh its part of substitution and dissociation. The hydrogen iodide probably reacts with the sulphur, its iodine being liberated.

Whatever the mechanism of the reaction the elimination of hydrogen sulfide continues and the temperature is raised, first to 210° and kept at this point for 4–5 hours, and does not cease until heating has been continued for 4–5 hours at 250° C.

There then remains only a very small quantity of unaltered phenol which may be removed by distillation. The phenol thus distilled carries with it the iodine and these two bodies recombine in the condenser. In an operation in which 38 grams of phenol are used there were recovered about 1.8 grams of unchanged phenol, the residue (95 per cent) was the sulfurized product.

The new sulfurized product obtained is viscous when hot. When cooled it is a dry, nonhygroscopic, vitreous mass, which may be powdered. The grey powder thus obtained is completely soluble in sodium carbonate.

This solution is a clear yellow. It parts with the sulfurized product to vegetable fibre, which remains white while it is immersed in the liquid but becomes dyed as though by a direct dyestuff for cotton when subsequently subjected to fulling, souring, washing and drying.

The particularly important fact has been established that in accordance with the proportion of sulphur to phenol by weight, the new sulfurized products impart to the vegetable fibre dyed in this manner a more or less marked affinity for basic dyestuffs. The sulfurized phenol obtained in the manner described in the foregoing example is valuable in this respect.

In making the new sulfurized phenol compounds of this invention there may be used instead of the sulphur and iodine any halogen combination comprising both sulphur and iodine or another halogen.

The new sulfurized phenolic compounds can advantageously be used as mordants for the dyeing of vegetable fibres by means of basic dyestuffs, but they are also applicable with a particularly great advantage in dyeings for artificial silk and especially cellulose acetate silk, where they enchance the intensity and brightness of the fibre, the mordant being dissolved in caustic soda solution or other convenient solvents. In general, they are used instead of tannin for the fixation of basic dyestuffs and the dyeings therewith are insensitive to iron so that the manipulations therewith can take place in any usual apparatus.

What I claim is:

1. The herein described manufacture of mordants for dyeing, consisting in heating a body of the phenol group with sulphur in the presence of a small proportion of a halogen acting as catalyst.

2. The herein described manufacture of mordants for dyeing, consisting in heating phenol with sulphur in the presence of a small proportion of a halogen acting as catalyst.

3. The herein described manufacture of mordants for dyeing, consisting in heating a body of the phenol group with sulphur in the presence of a small proportion of iodine as catalyst.

4. As a new article of manufacture, the mordant for dyeing consisting of a sulfurized phenol produced by reacting sulphur upon a phenolic body in the presence of a halogen as a catalyst, which mordant is a viscous mass in hot state which, upon being cooled, becomes vitreous and non-hygroscopic, shows a grey coloration and is soluble in akalies.

In witness whereof I have hereunto signed my name this 20th day of March, 1924, in the presence of two subscribing witnesses.

MARTIN BATTEGAY.

Witnesses:
AMAND BRAUN,
MADELEINE SPENGLER.